(12) United States Patent (10) Patent No.: US 9,183,063 B2
Jacobson et al. (45) Date of Patent: *Nov. 10, 2015

(54) POWER-CONSTRAINED COMPILER CODE GENERATION AND SCHEDULING OF WORK IN A HETEROGENEOUS PROCESSING SYSTEM

(71) Applicant: International Business Machines Corporation, Armonk, NY (US)

(72) Inventors: Hans M. Jacobson, White Plains, NY (US); Ravi Nair, Briarcliff Manor, NY (US); John K. P. O'Brien, South Salem, NY (US); Zehra N. Sura, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 231 days.

This patent is subject to a terminal disclaimer.

(21) Appl. No.: 13/680,295

(22) Filed: Nov. 19, 2012

(65) Prior Publication Data

US 2014/0136858 A1 May 15, 2014

Related U.S. Application Data

(63) Continuation of application No. 13/674,224, filed on Nov. 12, 2012.

(51) Int. Cl.
*G06F 9/50* (2006.01)
*G06F 9/46* (2006.01)
(Continued)

(52) U.S. Cl.
CPC .............. *G06F 9/5094* (2013.01); *G06F 1/329* (2013.01); *G06F 8/41* (2013.01); *G06F 9/46* (2013.01); *G06F 9/4893* (2013.01); *Y02B 60/144* (2013.01)

(58) Field of Classification Search
CPC ....... G06F 9/5094; G06F 9/46; G06F 9/4893; G06F 8/41; Y02B 60/144
See application file for complete search history.

(56) References Cited

U.S. PATENT DOCUMENTS 5,790,877 A   8/1998 Nishiyama et al.
6,795,781 B2 * 9/2004 Aldridge et al. ................ 702/60
(Continued)

OTHER PUBLICATIONS

Nevine Aboughazaleh, et al., "Collaborative Operating system and Compiler Power Management for Real-Time Applications," ACM Transactions on Embedded Computer Systems, vol. 5, No. 1, Feb. 2006, pp. 82-115.

(Continued)

*Primary Examiner* — Thomas Lee
*Assistant Examiner* — Mohammad A Rahman
(74) *Attorney, Agent, or Firm* — Cantor Colburn LLP

(57) ABSTRACT

An active memory system includes a computer and an active memory device including layers of memory forming a three-dimensional memory device and individual columns of chips forming vaults in communication with a processing element and logic. The processing element is configured to communicate to the chips and other processing elements. The active memory system also includes a compiler configured to implement a method. The method includes dividing a power budget for the active memory device into a discrete number of power tokens, each of the power tokens having an equal value of units of power. The method also includes determining a power requirement for executing a code segment on the processing element of the active memory device based on characteristics of the processing element and the code segment. The method further includes allocating, to the processing element at runtime, one or more power tokens to satisfy the power requirement.

25 Claims, 5 Drawing Sheets

(51) Int. Cl.
*G06F 1/32* (2006.01)
*G06F 9/48* (2006.01)
*G06F 9/45* (2006.01)

(56) References Cited

U.S. PATENT DOCUMENTS

| | | | |
|---|---|---|---|
| 8,566,804 B1* | 10/2013 | Carrick et al. | 717/135 |
| 2004/0025068 A1* | 2/2004 | Gary et al. | 713/300 |
| 2007/0192641 A1* | 8/2007 | Nagendra et al. | 713/300 |
| 2010/0146310 A1* | 6/2010 | Kasahara et al. | 713/300 |

OTHER PUBLICATIONS

Ana Azevedo, et al., "Architectural and Compiler Strategies for Dynamic Power Management in the COPPER Project," International Workshop on Innovative Architecture, pp. 1-10, 2001.

L.N. Chakrapani, et al., "The Emerging Power crisis in Embedded Processors: What can a (poor) compiler do?," CASES 2001, pp. 1-6.

M. Kandemir, et al., "Influence of Compiler Optimizations on System Power," Design Automation Conference, pp. 1-4, 2000.

Ulrich Kremer, "Low Power/Energy Compiler Optimizations," 35, Rutgers University, pp. 1-10, 2004.

Chingren Lee, et al., "Compiler Optimization on VLIW Instruction Scheduling for Low Power," ACM Transactions on Design Automation of Electronic Systems, pp. 1-17, 2003.

Vivek Tiwari, et al., "Instruction Level Power Analysis and Optimization of Software," Journal of VLSI signal Processing, pp. 1-18, 1996.

Vivek Tiwari, et al., "Compilation Techniques for Low Energy: An Overview," Symposium on Low Power Electronics, San Diego, CA, Oct. 1994, pp. 1-3.

U.S. Appl. No. 13/674,224; Non-Final Office Action, filed Nov. 12, 2012; Date Mailed: Nov. 4, 2014; 18 pages.

* cited by examiner

POWER-CONSTRAINED COMPILER CODE GENERATION AND SCHEDULING OF WORK IN A HETEROGENEOUS PROCESSING SYSTEM

CROSS-REFERENCE TO RELATED APPLICATIONS

This application is a continuation of U.S. patent application Ser. No. 13/674,224 filed Nov. 12, 2012, the entire contents of which are incorporated herein by reference.

BACKGROUND

The present invention relates generally to computer system management, and more particularly, to power-constrained compiler code generation and scheduling in a heterogeneous processing system.

In a heterogeneous processing system, power and performance characteristics differ among the varying types of processors. For example, one or more processors may have higher memory bandwidth than others, and some processors may have higher processing speed capabilities than others. Likewise, some types of tasks that are scheduled on the processing system require different memory bandwidth and processing speeds than other types of tasks. Thus, optimizing code for implementation on heterogeneous processors to conserve power can present challenges due to the different characteristics of the processors.

SUMMARY

According to an embodiment of the present invention, an active memory system is provided. The active memory system includes a computer and an active memory device that includes layers of memory forming a three-dimensional memory device and individual columns of chips forming vaults in communication with a processing element and logic. The processing element is configured to communicate to the chips and other processing elements. The active memory system also includes a compiler that produces executable code for the computer. The compiler is configured to implement a method. The method includes dividing a power budget for the active memory device into a discrete number of power tokens. Each of the power tokens has an equal value of units of power. The method also includes determining a power requirement for executing a code segment on the processing element of the active memory device. The determining is based on characteristics of the processing element and the code segment. The method further includes allocating, to the processing element at runtime, at least one of the power tokens to satisfy the power requirement.

According to another embodiment of the present invention, a method for implementing an active memory system is provided. The method includes dividing, via a compiler that produces executable code for a computer, a power budget for an active memory device into a discrete number of power tokens. The active memory device includes layers of memory forming a three-dimensional memory device and individual columns of chips forming vaults in communication with a processing element and logic. The processing element is configured to communicate to the chips and other processing elements. The method also includes determining a power requirement for executing a code segment on the processing element of the active memory device. The determining is based on characteristics of the processing element and the code segment. The method further includes allocating, to the processing element at runtime, at least one of the power tokens to satisfy the power requirement.

According to a further embodiment of the present invention, a computer program product for implementing an active memory system is provided. The computer program product includes a computer storage medium having program code embodied thereon, which when executed by a computer, causes the computer to implement a method. The method includes dividing a power budget for an active memory device into a discrete number of power tokens. The active memory device includes layers of memory forming a three-dimensional memory device and individual columns of chips forming vaults in communication with a processing element and logic. The processing element is configured to communicate to the chips and other processing elements. The method also includes determining a power requirement for executing a code segment on the processing element of the active memory device. The determining is based on characteristics of the processing element and the code segment. The method further includes allocating, to the processing element at runtime, at least one of the power tokens to satisfy the power requirement.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In accordance with exemplary embodiments, power-constrained compiler code generation and scheduling of work in a heterogeneous processing system (also referred to herein as "power-constrained compiler scheduling") is provided. In an embodiment, a compiler uses a static power model coupled with a runtime system to generate and execute power-efficient code for processors in the system. The compiler of the processing system divides source code into code segments, evaluates the power requirements needed for each code segment, and a number of power tokens commensurate with the power requirements are allocated, at runtime, to one or more processors for execution. In an embodiment, multiple versions of a code segment are generated by the compiler, each having varying power requirements, and one of the versions of code is selected at runtime for execution based on its power requirement in view of the remaining power budget. These and other features of the power-constrained compiler scheduling will now be described.

Figure 1:
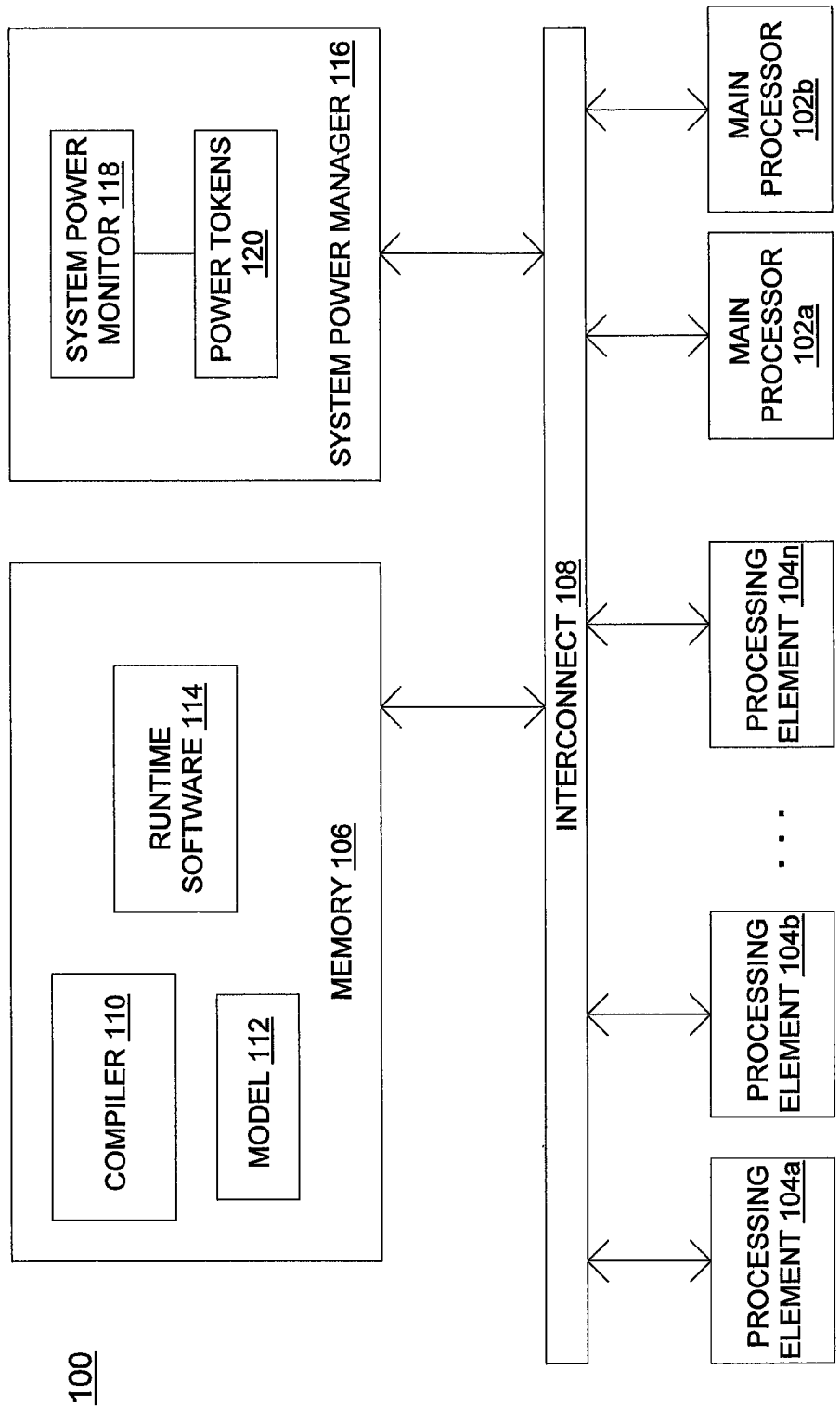
FIG. 1 illustrates a schematic diagram of a system for implementing power-constrained compiler code generation and scheduling in accordance with an embodiment.

Turning now to FIG. 1, a system 100 upon which the power-constrained compiler scheduling may be implemented includes main processors 102a-102b, processing elements 104a-104n, and a memory system 106 communicatively coupled to an interconnect network 108.

The main processors 102a-102b and the processing elements 104a-104n are implemented as hardware devices for executing software and include heterogeneous computer processors having different performance and physical characteristics. For example, the main processors 102a-102b may be high-performance general-purpose processors, and the processing elements 104a-104n may be virtually any custom made or commercially available processors, central processing units (CPUs), data signal processors (DSP), or auxiliary processors. In an embodiment described in FIG. 4, the processing elements 104a-104n form part of an active memory system. When described collectively, the main processors and the processing elements are referred to herein as "processors."

The interconnect network 108 may be, for example, but is not limited to, one or more buses or other wired or wireless connections, as is known in the art. The interconnect network 108 may have additional elements, such as controllers, buffers (caches), drivers, repeaters, and receivers, to enable communications. Further, the interconnect network 108 may include address, control, and/or data connections to enable appropriate communications among the aforementioned components.

The memory system 106 is implemented as a computer readable memory and may include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory system 106 may incorporate electronic, magnetic, optical, and/or other types of storage media. It will be understood that the memory system 106 may have a distributed architecture, where various components are situated remote from one another, but can be accessed by the main processors 102a-102b and the processing elements 104a-104n.

The memory system 106 may store one or more separate programs, each of which comprises an ordered listing of executable instructions for implementing logical functions. For example, software stored in the memory system 106 may include an operating system (not shown), source code (not shown), and one or more applications. As shown in FIG. 1, the memory system 106 also stores a compiler 110, a static power model 112, and runtime software 114.

The compiler 110 may alternatively be stored and executed on a system that is external to the system 100 for which it produces executable programs. The compiler 110 includes numerous functional components for implementing the features, processes, methods, functions, and operations of the exemplary embodiments, as will be described further herein. Optimized code is executed in a runtime environment by the runtime software 114 of the system 100.

The applications may include a source program, executable program (object code), script, or any other entity comprising a set of instructions to be performed. When the application is a source program, the program is translated via the compiler 110.

The static power model 112 (also referred to as "model") may be established by taking into account the characteristics of the system 100. The model 112 may also be established by running program simulations and determining probable outcomes of various code segments or features. The model 112 enables the compiler 110 to predict program performance for various configurations. Like the compiler 110, the static power model 112 may alternatively be stored on a system that is external to the system 100 that is targeted by the model 112.

When the system 100 is in operation, the main processor 102 and the processing elements 104a-104n are configured to execute software stored within the memory system 106, to communicate data to and from the memory system 106, and to generally control operations of the system 100 pursuant to the software.

The system 100 also includes a system power manager 116 communicatively coupled to the interconnect network 108. The system power manager 116 manages a power budget that is monitored by a system power monitor 118 and is used to execute one or more programs on the system 100. The system power manager 116 may be implemented in hardware or in software or in both hardware and software, and it communicates with the system power monitor 118 to regulate and control the allocation of power tokens 120 to processors of the system 100.

In an embodiment, the system power manager 116 is implemented in both hardware and software for a heterogeneous computing system with multiple types of processing elements. In this case, a software component of the system power manager 116 works actively and collaboratively with a hardware component of the system power manager 116 to enforce power constraints across the system. The hardware component of the system power manager 116 regulates and manages power for those processing elements (e.g., one or more of processing elements 104a-104n) for which it is difficult to a priori predict the amount of power required by them during code execution. The software component of the system power manager 116 is delegated the task of regulating and managing power for those processing elements for which it is possible to statically predict power requirements. The hardware component is responsible for managing the overall system power budget. The software component requests/releases control over some part of this overall power budget at different time points in the execution, depending on the requirements of the code executing on the processing elements that it manages. A collaborative hardware and software implementation for the system power manager 116 is advantageous for several reasons: it enables proactive power management and application-wide optimization for those parts of the system where power requirements can be statically predicted, it allows flexibility in code generation so that code can be optimized for a given power budget, and it reduces the complexity of a pure hardware implementation for a large, heterogeneous system.

A power token 120 refers to one or more units of power that can be reserved for a code segment compiled by the compiler 110, and those units of power are allocated to a processor at runtime for executing the code segment. One or more power tokens 120 may be allocated to one or more processors based on a determined power requirement to execute a code segment, as will be described further herein. Upon completion of the execution, any allocated power tokens 120 may be released back to the system power manager 116 for re-allocation to another code segment. The system power monitor 118 monitors the overall use of power by the system 100 in view of a power budget that has been created for the execution of program code.

While only two main processors 102a-102b are shown in FIG. 1 for convenience of illustration, it will be understood that any number of main processors may be employed by the system 100 in order to realize the advantages of the embodiments described herein.

Figure 2:
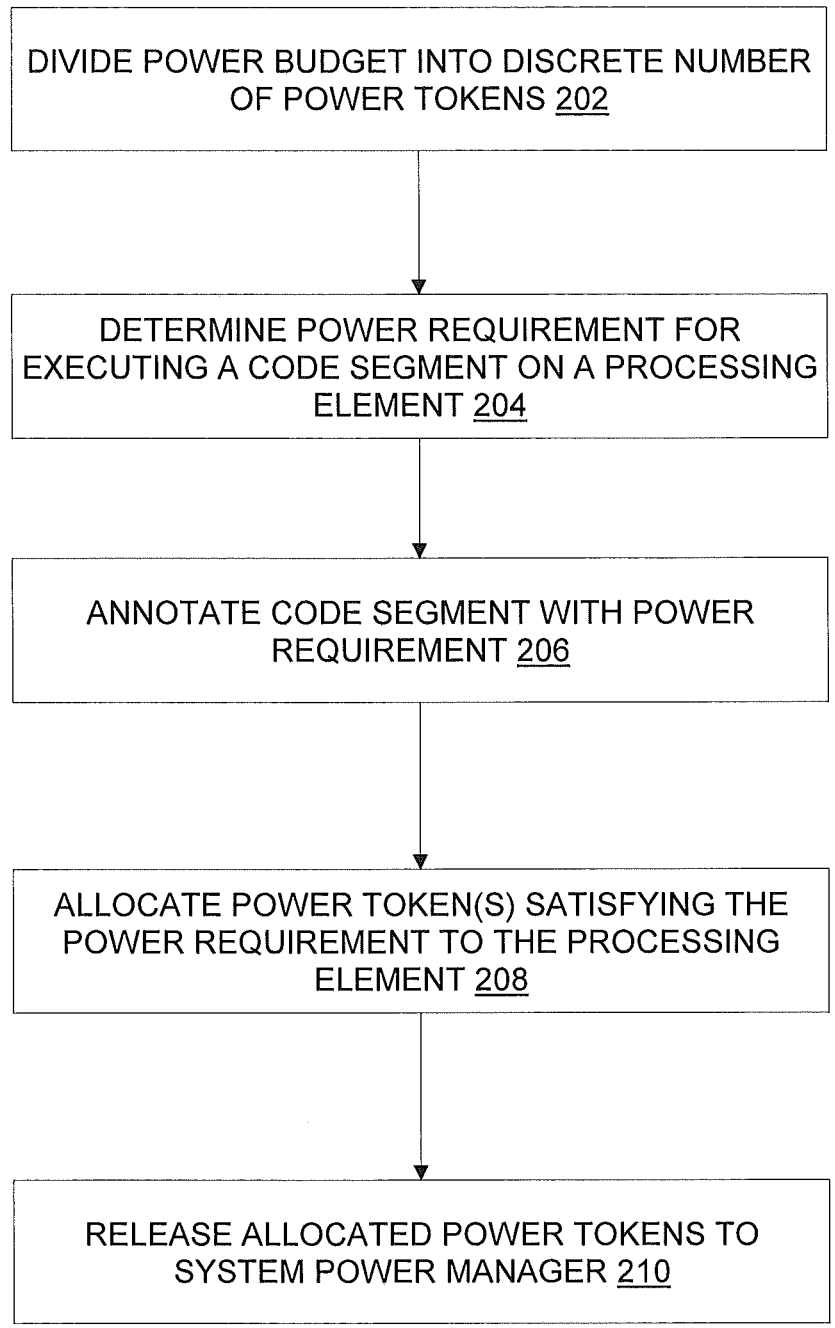
FIG. 2 illustrates a flow diagram of a method for generating code optimized for power scheduling in accordance with an embodiment.

Turning now to FIG. 2, a flow diagram describing a method for generating code optimized for power scheduling will now be described in accordance with an embodiment. The process of FIG. 2 assumes that the compiler 110 has divided a program for execution into code segments. At block 202, a power budget for executing a program is divided into a discrete number of power tokens. This power budget may be statically determined by the compiler 110, or dynamically determined by the system power manager 116.

At block 204, the compiler 110 determines a power requirement needed for executing a code segment on a given processing element. This may be implemented using the model 112. For example, if a code segment is to be executed in order on a processing element and does not use memory caches or speculative execution, these characteristics may be used to statically predict the power requirements of the code segment executing on the processing element. Such a static prediction is more accurate and deterministic compared to predicting the power requirements for code executing on a general-purpose main processor (e.g., one or both of main processors 102a-102b). Thus, the compiler 110 uses the model 112 to ensure that each code segment can be executed within the given power requirement.

In an embodiment, the compiler 110 first generates code optimized for a specific criterion (e.g. speed of execution), and then determines the power requirement for the generated code. In another embodiment, the compiler 110 first determines the maximum power to be allocated for executing the code segment, and then generates optimized code that conforms to that power allocation. During code generation, the compiler 110 may perform several functions to optimize the code for power: it may schedule instructions to interleave high-power operations with low-power operations, it may insert no-ops to adhere to power constraints, it may change the set of code transforms applied during optimization, and it may use heuristics and iterative re-compilation to optimally meet a power budget.

At block 206, the compiler 110 annotates the code segment to include the power requirement. This annotation may also include an indication of the priority of this code segment relative to other concurrently executing code segments, which can be used by the runtime software to take informed action when dealing with system power emergencies. The annotations may be implemented, e.g., by a tag or notation appended to the code segment.

At block 208, one or more power tokens 120 having a number of units of power determined to satisfy the power requirement are allocated to the processing element, and the processing element executes the code segment using the power allocated pursuant to the power token(s) 120. At block 210, the allocated power tokens 120 are released to the system power manager 116 for re-allocation to another code segment.

While only a single processing element is described in FIG. 2 for executing the code segment, it will be understood that the embodiments of the invention are not so limited. For example, a code segment may be split among two or more processors for execution (e.g., parallel processing) based on the needs or configuration of the system. In this event, the power tokens 120 are shared by the two or more processors for executing the code segment.

Figure 3:
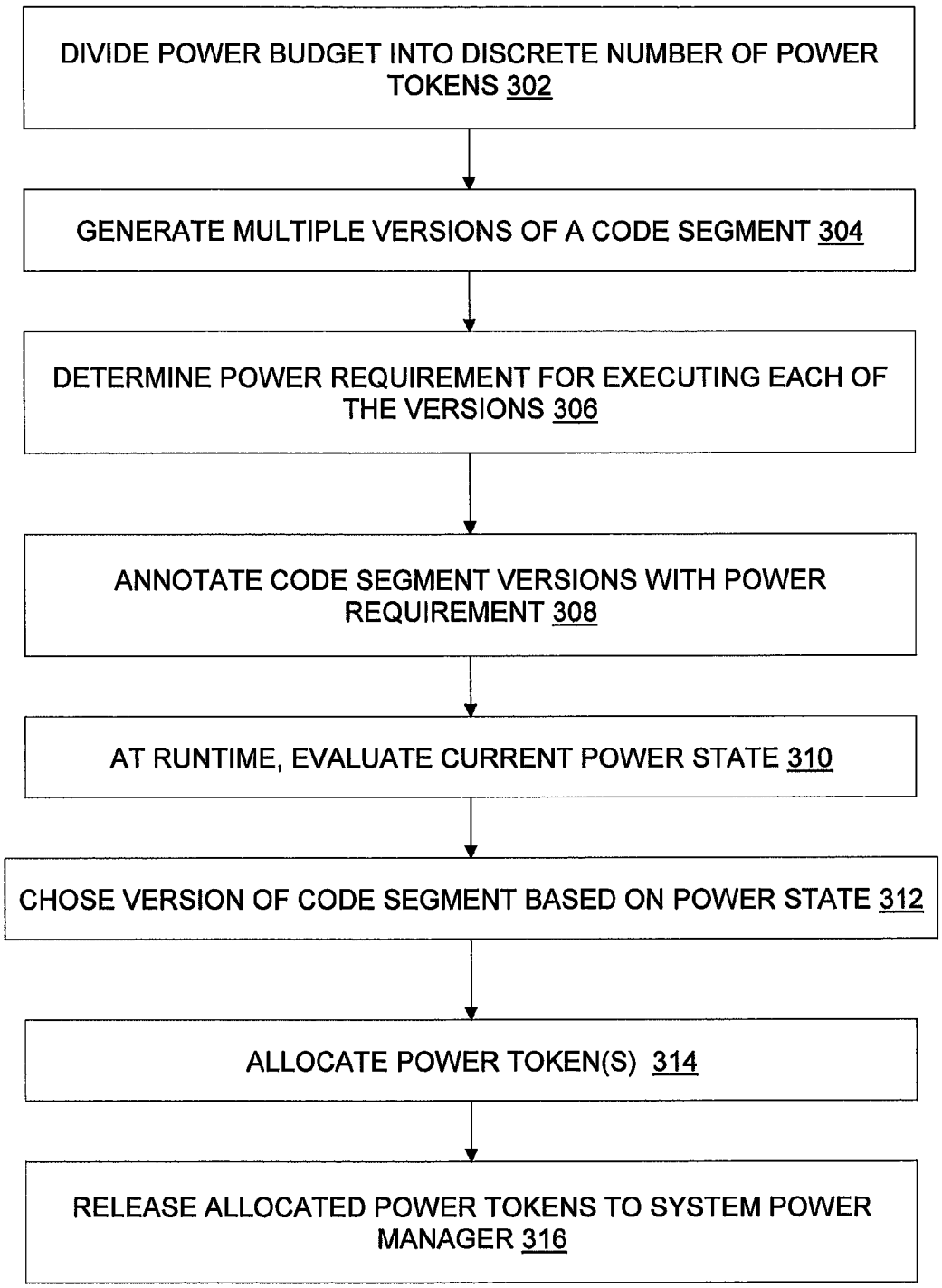
FIG. 3 illustrates a flow diagram for optimizing code for a code segment by selecting a version of the code segment based on its power requirement in accordance with an embodiment.

As indicated above, multiple versions of a code segment may be generated by the compiler, each having varying power requirements, and one of the versions of code may be selected at runtime for execution based on its power requirement in view of the remaining power budget. Turning now to FIG. 3, a flow diagram describing a process for optimizing code for a code segment by selecting a version of the code segment based on its power requirement will now be described.

At block 302, a power budget for executing a program is divided into a discrete number of power tokens.

At block 304, the compiler 110 generates multiple versions of the code segment. Each of the versions is generated to require differing amounts of power. For example, one version may be generated for optimized performance (e.g., speed) and so may require more power than another version that is generated to conserve power.

The compiler 110 determines the power requirement needed for executing each of the code versions at block 306. At block 308, the compiler 110 annotates the code segment versions to include the power requirement. This may be implemented, e.g., by a tag or notation appended to the code segment versions.

At block 310, at runtime, the current power state is determined. For example, a remaining power budget may be ascertained based on previous power usage which is determined by the system power monitor 118, and by the number of unassigned power tokens remaining with the system power manager 116.

At block 312, a code version is selected based on the power state determination made in step 310. For example, if a small amount of power remains in the power budget, the runtime software 114 may select a code version that requires the least amount of power tokens 120 for execution. The runtime software 114, working with the system power manager, allocates the power tokens 120 associated with the selected version to a processing element at block 314, and the code segment for that version is executed by that processing element.

At block 316, the runtime software 114 releases the allocated power tokens 120 to the system power manager 116 for re-allocation.

While only a single processing element is described in FIG. 3 for executing the code segment, it will be understood that the embodiments of the invention are not so limited. For example, a code segment may be split among two or more processors for execution (e.g., parallel processing) based on the needs or configuration of the system. In this event, the power tokens 120 are shared by the two or more processors for executing the code segment.

Figure 4:
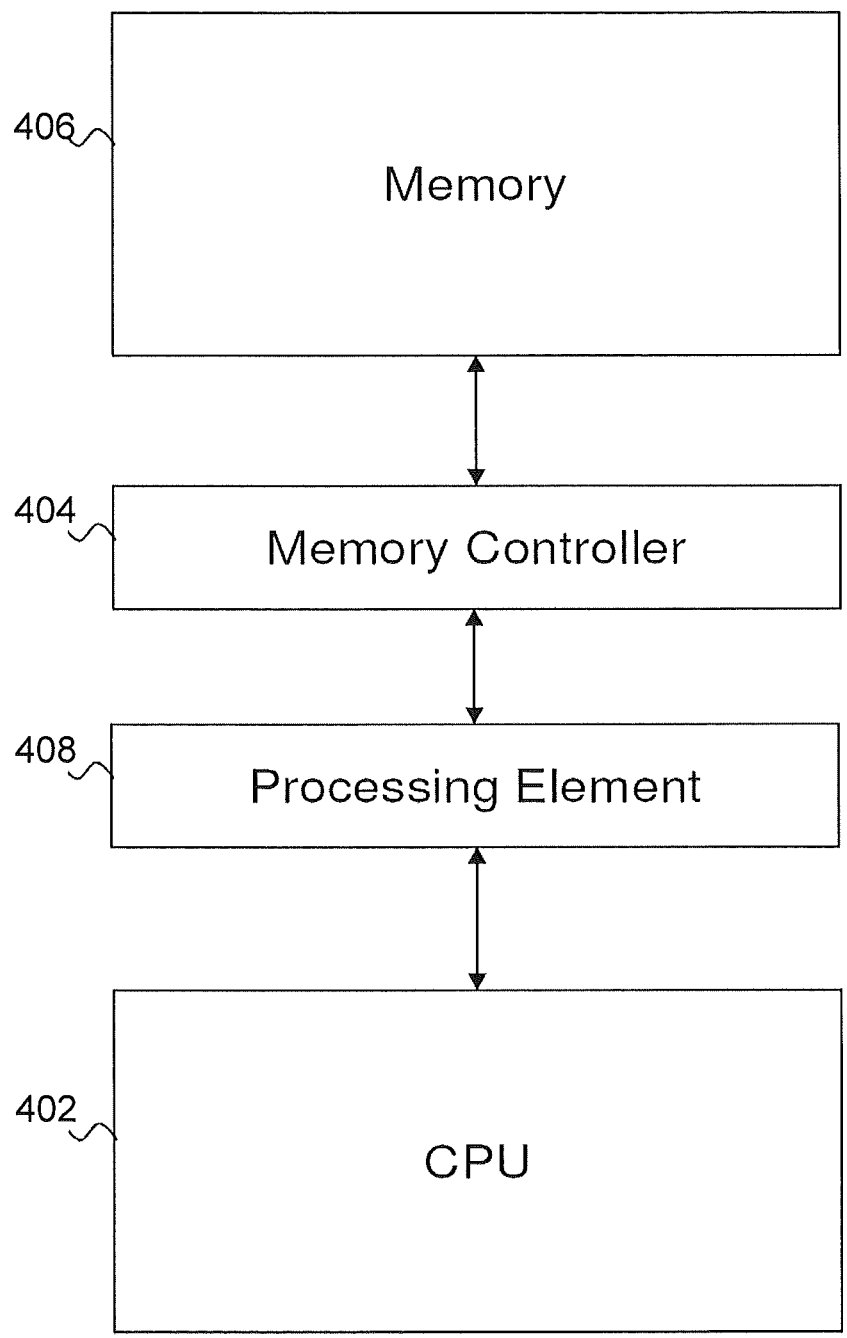
FIG. 4 illustrates a block diagram of a system for active memory utilized in implementing the power-constrained compiler code generation and scheduling in accordance with an embodiment.
Figure 5:
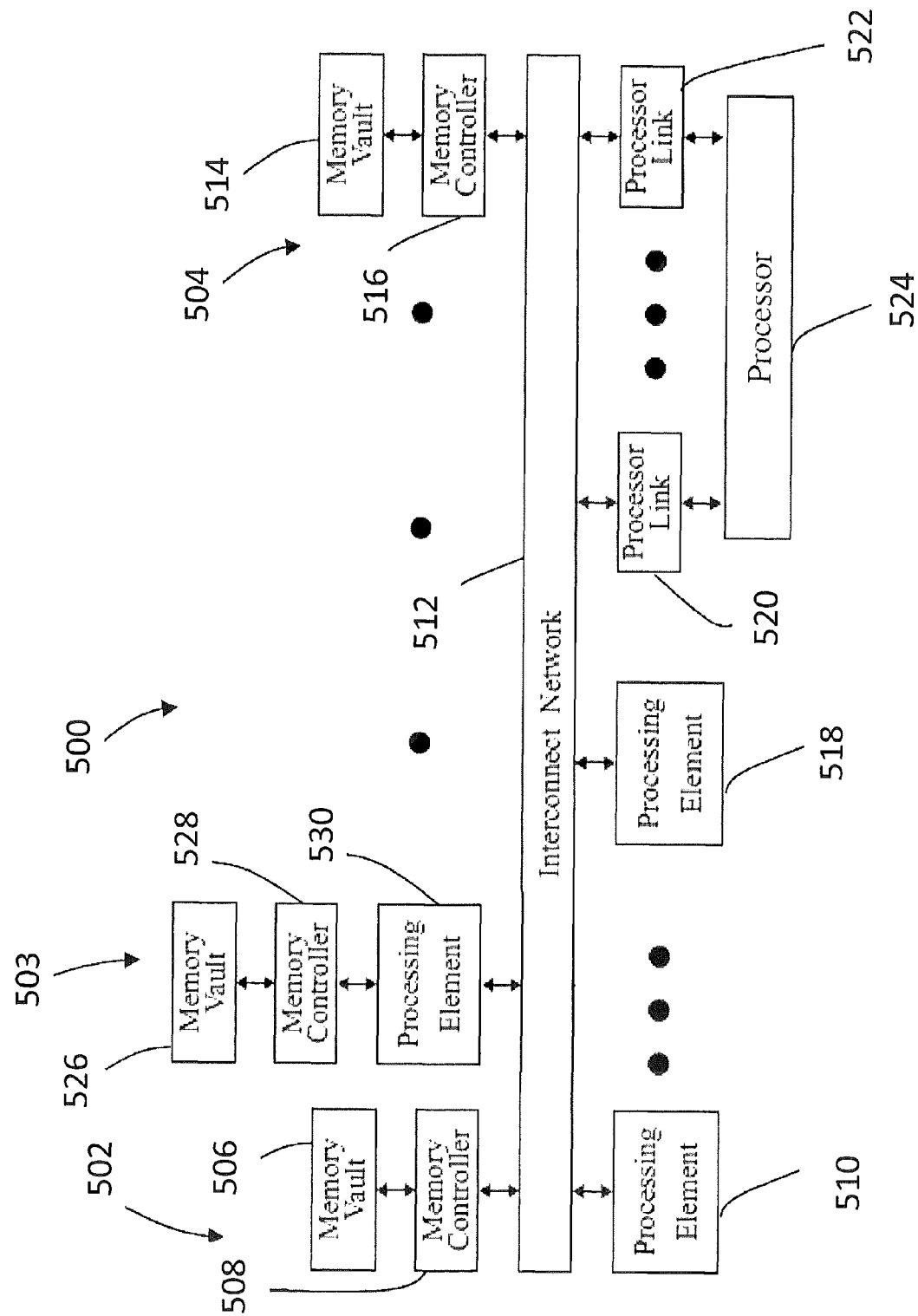
FIG. 5 illustrates a block diagram of a memory system with active memory utilized in implementing the power-constrained compiler code generation and scheduling in accordance with an embodiment.

As indicated above, the processing elements 104a-104n may form part of an active memory system. FIG. 4 illustrates a block diagram of a system 400 with active memory upon which the power-constrained compiler code generation and scheduling of work may be implemented, and FIG. 5 illustrates a block diagram of a memory system 500 with active memory upon which the power-constrained compiler code generation and scheduling of work may be implemented.

The active memory device may be any suitable memory device including a plurality of memory elements (e.g., chips) connected to a logic portion and a processing element. In an embodiment, the active memory device includes layers of memory that form a three dimensional ("3D") memory device (e.g., a memory cube) where individual columns of chips form vaults in communication with the processing element and logic. The active memory device may include a plurality of processing elements configured to communicate to the chips and other processing elements. In an embodiment, a processing element accesses a selected address in a vault through an interconnect network. In addition, the interconnect network provides a communication path between processing elements and vaults on the active memory device as well as between processing elements and a main processor. Each vault may have an associated memory controller or logic unit that is also coupled to the interconnect network.

Embodiments include an active memory device that can perform a complex set of operations using multiple locations (e.g., data stored at specific addresses) within the active memory device as operands. Further, a process is provided whereby the instructions and operations are performed autonomously on these operands within the active memory device. Specifically, the instructions are stored within the active memory device itself and are not executed by a main processor. The stored instructions are provided to the processing elements for processing by the processing element in the active memory device. In one embodiment, the processing elements are programmable engines, including an instruction buffer, an instruction unit with branching capability and instruction decode, a mixture of vector, scalar, and mask register files, a plurality of load/store units for the movement of data between memory and the register files, and a plurality of execution units for the arithmetic and logical processing of various data types. Also included in the active memory device are address translation capabilities for converting virtual addresses to physical addresses, a unified Load/Store Queue to sequence data movement between the memory and the processing elements, and a processor communications unit, for communication with the main processor.

In one embodiment, the processing element is included with the memory controller as part of the stack. In addition, the processing element may perform complex arithmetic and logic operations on the operands, and read and write end results back to locations in memory. The active memory device may return a single result value or signal to the main processor indicating that the results of the desired complex operation are ready in the active memory device, thus performing the high bandwidth processing on the active memory device and using a lower bandwidth communication between the active memory device and main processor.

The processing capabilities within an active memory device may reduce memory latency and energy consumption that would otherwise be experienced when memory is accessed by a processor residing in a separate chip. Instead of bringing data from memory to the separate processing chip through lower bandwidth communication paths, performing what is often quite simple calculations on the data, and then transferring the processed data back to memory, the main processor can configure the processing elements within the active memory device, and then instruct them to carry out the data processing tasks. This may be achieved by sending one or more commands from the main processor to the active memory device. In this scenario, the movement of data between the location where the data processing is performed and memory is greatly reduced, both in the distance it has to travel from the memory to the data processing location, and in the number of levels of cache traversed through a memory hierarchy.

FIG. 4 illustrates a block diagram of a system 400 for storing and retrieving data in a memory in accordance with an embodiment. The system 400 depicted in FIG. 4 includes a computer processor (CPU) 402, a memory 406 having memory devices, as well as a memory controller 404 and processing element 408 for receiving and processing data from the computer processor 402 to be stored in the memory 406.

The memory controller 404 may be in communication with the computer processor 402 and receive write requests from the computer processor 402 without using functions of the processing element 408. The write requests contain data to be written to the memory 406 and a real address for identifying the location in the memory 406 to which the data will be written. The memory controller 404 stores data at a real address within the memory 406. The computer processor 402 can map the virtual address to a real address in the memory 406 when storing or retrieving data. The real address for a given virtual address may change each time data in the memory 406 is modified.

In an embodiment, the processing element 408 is in communication with the computer processor 402 and receives a command from the computer processor 402. The command may correspond to instructions stored in the memory 406 to perform write requests for data to be written to the memory 406. The command may also include a virtual address for identifying the location in the memory 406 to which the data will be written. The memory controller 404 and/or processing element 408 stores data at a real address within the memory 406. In an embodiment, the processing element 408 maps the virtual address to a real address in the memory 406 when storing or retrieving data. As described in further detail below, the computer processor 402 provides commands to the memory 406, where the processing element 408 receives the command and fetches corresponding instructions from the memory 406. The system 400 is one example of a configuration that may be utilized to perform the processing described herein. Although the system 400 has been depicted with only a single memory 406, memory controller 404, processing element 408 and computer processor 402, it will be understood that other embodiments would also operate in other systems with two or more of the memory 406, memory controller 404, processing element 408 or computer processor 402. In an embodiment, the memory 406, memory controller 404, processing element 408 and computer processor 402 are not located within the same computer. For example, the memory 406, processing element 408 and memory controller 404 may be located in one physical location (e.g., on a memory module) while the computer processor 402 is located in another physical location (e.g., the computer processor 402 accesses the memory controller 404 and/or processing element 408 via a network). In addition, portions of the processing described herein may span one or more of the memory 406, memory controller 404, processing element 408 and computer processor 402.

FIG. 5 is a schematic diagram of an embodiment of a computer system 500 implementing active memory. In one embodiment, the computer system 500 includes an active memory device 502, an active memory device 503 and an active memory device 504. The active memory device 502 includes a memory vault 506, a memory controller 508 and a processing element 510. In an embodiment, the processing element 510, memory vault 506 and memory controller 508 are coupled and communicate via an interconnect network 512. Specifically, the processing element 510 communicates to the memory vault 506, memory controller 508 and other memory devices, such as active memory devices 503 and 504, via the interconnect network 512. The interconnect network 512 is also coupled to a main processor 524 by processor links 520 and 522. The interconnect network 512 provides a fast and high bandwidth path for communication between portions of the device, such processing elements, memory controllers and memory, to provide improved performance and reduced latency for the active memory.

The active memory device 503 includes a memory vault 526, a memory controller 528 and a processing element 530. In an embodiment, the processing element 530, memory vault 526 and memory controller 528 are all located on the same side of the interconnect network 512, such as within a single stack. By positioning the processing element 530 in the same stack as memory vault 526, the latency is reduced when accessing locations in the memory vault 526, thus further improving performance. In one embodiment, the active memory device 504 includes a memory vault 514 and memory controller 516 coupled to processing element 510 and processing element 518 via the interconnect network 512. As depicted, the processing element 518 is located on the other side of the interconnect network 512 from the memory controller 516 and memory vault 514. In embodiments, the active memory devices 502, 503 and 504 include multiple layers of stacked addressable memory elements. Further, the stacked memory may be divided into memory vaults 506, 526 and 514, or three-dimensional blocked regions of the memory device which share a common memory controller and/or memory element, and are capable of servicing memory access requests to their domain of memory independently of one another.

In embodiments, the processing elements, memory vaults and memory controllers may be arranged in a suitable manner depending on the application. For example, one or more processing elements, such as processing element 518, may be positioned on one side of the interconnect network 512 and may operate as a pool of processing elements that are available for accessing any memory in the memory system coupled to the interconnect network 512. The pooled processing elements are not limited to accessing a particular memory vault and, thus, one or more elements may be utilized upon receiving a command from the main processor 524. Accordingly, processing element 518 may be configured to access each memory vault 506, 526 and 514. In another embodiment, one or more processing element, such as processing element 530, is located as part of a stack including a memory vault 526 and memory controller 528. In such a configuration, the processing element 530 is configured to access memory vault 526 coupled to the interconnect network 512, including memory vaults 506 and 514. In one embodiment, one or more processing element, such as processing element 510, is positioned on an opposite side of the interconnect network 512 from the memory vault 506 and memory controller 508. In the configuration, the processing element 510 is configured to access any memory coupled to the interconnect network 512, including memory vaults 526 and 514.

In an embodiment, the computer system may include a plurality of active memory devices, such as the active memory devices 502, 503 and 504. Further, each active memory device may include a plurality of stacks, each stack including a memory vault, memory controller and associated processing element. In one example, the number of processing elements may be greater than the number of memory vaults. In another embodiment, the memory devices may include fewer processing elements than memory vaults. In embodiments, the processing elements are pooled and available to access any memory in the system. For example, a memory device may include 16 memory vaults and memory controllers, but only eight processing elements. The eight processing elements are pooled, and utilized as resources for accessing any memory vaults coupled to the interconnect network. In another example, a memory device may be passive, where the device is controlled by processing elements of active memory devices coupled to the interconnect network.

The optimized distribution of work process may be implemented using the system and components described in FIGS. 4-5. The system has at least two distinct processor types, the main processors 524 and the processing elements 510/518. The different processor types have different characteristics that impact the performance of code that executes on them, e.g. the processing elements have higher memory bandwidth, lower latency to main memory, higher degree of multi-processing, richer set of vector instructions, and more power efficient computation compared to the main processors. On the other hand, the main processors have access to privileged operations through the operating system, support a stack and traditional calling conventions that allow for generic and recursive function calls, have data and instruction caches, and implement speculative out-of-order execution to enable faster execution times. As a result, certain code segments may exhibit better power-performance characteristics on the main processors (e.g. code with lots of memory re-use, or branches and calls), while certain other code segments may exhibit better power-performance characteristics on the processing elements (e.g. code that performs random accesses on large datasets, or streaming computation). To maximize utilization of the whole system and achieve the fastest execution, work must be judiciously divided between the different processor types. The compiler process described in FIGS. 2-3 can optimize the distribution of work across the main processors and processing elements such that all processors in the system are optimally utilized.

Further, the system and components described in FIGS. 4-5 provide opportunities for optimization, e.g., execution time can be improved by exploiting the many more levels of parallelism available in the system (different types of processors, multiple processors of each type, slices within processing elements, vector processing, and multi-threading). However, the system also has new constraints, e.g. the power budget may not allow all processors in the system to be simultaneously active. Both these features directly impact the process of optimally distributing work, requiring sophisticated analysis in the compiler process described in FIGS. 2-3. For instance, a code segment may be scheduled for execution on a processing element even though it has better power-performance characteristics on a main processor, because the power constraints do not allow the main processor to be active at that point in the execution. Parameters associated with the power budget may be configured via the compiler and used to assess whether a code segment should be executed on a main processor or a processing element.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, blocks, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or schematic diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As described above, embodiments can be embodied in the form of computer-implemented processes and apparatuses for practicing those processes. In embodiments, the invention is embodied in computer program code executed by one or more network elements. Embodiments include a computer program product on a computer usable medium with computer program code logic containing instructions embodied in tangible media as an article of manufacture. Exemplary articles of manufacture for computer usable medium may include floppy diskettes, CD-ROMs, hard drives, universal serial bus (USB) flash drives, or any other computer-readable storage medium, wherein, when the computer program code logic is loaded into and executed by a computer, the computer becomes an apparatus for practicing the invention. Embodiments include computer program code logic, for example, whether stored in a storage medium, loaded into and/or executed by a computer, or transmitted over some transmission medium, such as over electrical wiring or cabling, through fiber optics, or via electromagnetic radiation, wherein, when the computer program code logic is loaded into and executed by a computer, the computer becomes an apparatus for practicing the invention. When implemented on a general-purpose microprocessor, the computer program code logic segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. An active memory system, comprising:
   a computer;
   an active memory device including layers of memory forming a three-dimensional memory device and individual columns of chips forming vaults in communication with a processing element and logic, the processing element configured to communicate to the chips and other processing elements; and
   a compiler for producing source code that is executable by the computer, the compiler configured to implement a method, the method comprising:
   dividing a power budget for the active memory device into a discrete number of power tokens, each of the power tokens having an equal value of units of power;
   determining a power requirement for executing a code segment on the processing element of the active memory device, the determining based on characteristics of the processing element and the code segment;
   annotating the code segment to include the power requirement responsive to the determining, the annotating including indicating a priority of the code segment relative to other concurrently executing code segments; and
   allocating, to the processing element at runtime, at least one of the power tokens to satisfy the power requirement.

2. The active memory system of claim 1, wherein the allocating at least one of the power tokens includes reserving, from the power budget, units of the power that are commensurate with the power requirement for use by the processing element.

3. The active memory system of claim 1, wherein the annotating further includes appending at least one of a tag and a notation to the code segment.

4. The active memory system of claim 1, wherein the method further includes:
   performing code motion and scheduling for the code segment, the code motion and scheduling including interspersing low power operations with high power operations.

5. The active memory system of claim 1, wherein the method further comprises:
   releasing, via a runtime system of the active memory system, allocated power tokens to a system power manager after execution of the code segment.

6. The active memory system of claim 1, wherein the method further comprises:
   determining a power requirement for executing another code segment that is split among multiple processing elements of the active memory system, the determining based on characteristics of the multiple processing elements and the other code segment;
   wherein power tokens satisfying the power requirement of the other code segment are allocated across the multiple processing elements.

7. The active memory system of claim 1, wherein the method further comprises:
   generating multiple versions of executable code for the code segments, each of the multiple versions is optimized using a different sequence of code transformations, and each of the multiple versions targets a different maximum power requirement;
   determining a power requirement for executing each of the multiple versions of the executable code, each of the multiple versions of the executable code is associated with a different number of the power tokens;
   selecting, at runtime, one of the multiple versions of the executable code for execution having an allocated number of the power tokens that most closely matches a number of available power tokens.

8. The active memory system of claim 1, wherein the method further comprises:
   simultaneously generating tasks and determining a number of the power tokens needed to execute each of the tasks;
   allocating the number of the power tokens for each of the tasks; and
   scheduling, via a runtime system, the tasks across multiple processing elements based on the number of power tokens allocated.

9. A method for implementing power-constrained compiler code generation and scheduling in an active memory system, comprising:
   dividing, via a compiler that produces executable code for a computer, a power budget for an active memory device into a discrete number of power tokens, each of the power tokens having an equal value of units of power, the active memory device including layers of memory forming a three-dimensional memory device and individual columns of chips forming vaults in communication with a processing element and logic, the processing element configured to communicate to the chips and other processing elements;
   determining a power requirement for executing a code segment on the processing element of the active memory device, the determining based on characteristics of the processing element and the code segment;
   annotating the code segment to include the power requirement responsive to the determining, the annotating including indicating a priority of the code segment relative to other concurrently executing code segments; and
   allocating, to the processing element at runtime via the compiler, at least one of the power tokens to satisfy the power requirement.

10. The method of claim 9, wherein the allocating at least one of the power tokens includes reserving, from the power budget, units of the power that are commensurate with the power requirement for use by the processing element.

11. The method of claim 9,
wherein the annotating includes appending at least one of a tag and a notation to the code segment.

12. The method of claim 9, further comprising:
performing code motion and scheduling for the code segment, the code motion and scheduling including interspersing low power operations with high power operations.

13. The method of claim 9, further comprising:
releasing, via a runtime system of the active memory system, allocated power tokens to a system power manager after execution of the code segment.

14. The method of claim 9, further comprising:
determining a power requirement for executing another code segment that is split among multiple processing elements of the active memory system, the determining based on characteristics of the multiple processing elements and the other code segment;
wherein power tokens satisfying the power requirement of the other code segment are allocated across the multiple processing elements.

15. The method of claim 9, further comprising:
generating multiple versions of executable code for the code segments, each of the multiple versions is optimized using a different sequence of code transformations, and each of the multiple versions targets a different maximum power requirement;
determining a power requirement for executing each of the multiple versions of the executable code, each of the multiple versions of the executable code is associated with a different number of the power tokens;
selecting, at runtime, one of the multiple versions of the executable code for execution having an allocated number of the power tokens that most closely matches a number of available power tokens.

16. The method of claim 9, further comprising:
simultaneously generating tasks and determining a number of the power tokens needed to execute each of the tasks;
allocating the number of the power tokens for each of the tasks; and
scheduling, via a runtime system, the tasks across multiple processing elements based on the number of power tokens allocated.

17. A computer program product for implementing power-constrained compiler code generation and scheduling in an active memory system, the computer program product comprising a computer storage medium embodied with program code, which when executed by a computer causes the computer to implement a method, the method comprising:
dividing, via a compiler that produces executable code for a computer, a power budget for an active memory device into a discrete number of power tokens, each of the power tokens having an equal value of units of power, the active memory device including layers of memory forming a three-dimensional memory device and individual columns of chips forming vaults in communication with a processing element and logic, the processing element configured to communicate to the chips and other processing elements;
determining a power requirement for executing a code segment on the processing element of the active memory device, the determining based on characteristics of the processing element and the code segment;
annotating the code segment to include the power requirement responsive to the determining, the annotating including indicating a priority of the code segment relative to other concurrently executing code segments; and
allocating, to the processing element at runtime via the compiler, at least one of the power tokens to satisfy the power requirement.

18. The computer program product of claim 17, wherein the allocating at least one of the power tokens includes reserving, from the power budget, units of the power that are commensurate with the power requirement for use by the processing element.

19. The computer program product of claim 17, wherein the annotating includes appending at least one of a tag and a notation to the code segment.

20. The computer program product of claim 17, wherein the method further comprises:
requesting at least one of the power tokens from a system power manager of the active memory system.

21. The computer program product of claim 17, wherein the method further comprises:
performing code motion and scheduling for the code segment, the code motion and scheduling including interspersing low power operations with high power operations.

22. The computer program product of claim 17, wherein the method further comprises:
releasing, via a runtime system of the active memory system, allocated power tokens to a system power manager after execution of the code segment.

23. The computer program product of claim 17, wherein the method further comprises:
determining a power requirement for executing another code segment that is split among multiple processing elements of the active memory system, the determining based on characteristics of the multiple processing elements and the other code segment;
wherein power tokens satisfying the power requirement of the other code segment are allocated across the multiple processing elements.

24. The computer program product of claim 17, wherein the method further comprises:
generating multiple versions of executable code for the code segments, each of the multiple versions is optimized using a different sequence of code transformations, and each of the multiple versions targets a different maximum power requirement;
determining a power requirement for executing each of the multiple versions of the executable code, each of the multiple versions of the executable code is associated with a different number of the power tokens;
selecting, at runtime, one of the multiple versions of the executable code for execution having an allocated number of the power tokens that most closely matches a number of available power tokens.

25. The computer program product of claim 17, wherein the method further comprises:
simultaneously generating tasks and determining a number of the power tokens needed to execute each of the tasks;
allocating the number of the power tokens for each of the tasks; and
scheduling, via a runtime system, the tasks across multiple processing elements based on the number of power tokens allocated.

* * * * *